Patented June 5, 1934

1,961,963

UNITED STATES PATENT OFFICE 1,961,963

PROCESS FOR BREAKING PETROLEUM EMULSIONS

Melvin De Groote, St. Louis, and Arthur F. Wirtel, Richmond Heights, Mo., assignors to Tretolite Company, Webster Groves, Mo., a corporation of Missouri No Drawing. Application December 21, 1933, Serial No. 703,404

21 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil" and "bottom settlings".

The object of our invention is to provide a novel and inexpensive process for separating emulsions of the character referred to into their component parts of oil and water or brine.

Briefly described, our process consists in subjecting a petroleum emulsion of the water-in-oil type, to the action of a treating agent or demulsifying agent of the kind hereinafter described, thereby causing the emulsion to break down and separate into its component parts of oil and water or brine, when the emulsion is permitted to remain in a quiescent state after treatment, or subjected to equivalent separatory procedure.

The treating agent or demulsifying agent used in our process comprises a sulfonic acid body derived from hyrocarbons of the group consisting of abietene, abietine, and abietane, by chemical combination with members of the group consisting of aldehydes and compounds which react like aldehydes,—in presence of a sulfonating agent.

Abietane is obtained by the hydrogenation of abietene. Abietene is derived from abietic acid. Abietic acid is obtained from wood rosin or colophony. Natural rosin is a solid vitreous modification of abietic acid. Various methods and procedures are employed to obtain abietic acid from rosin, and abietic acid can be treated in various ways so as to yield or produce abietene.

In producing abietene commercially it is not necessary to convert rosin or like material into abietic acid and then convert the abietic acid into abietene, but as a matter of fact, abietene may be obtained directly from wood rosin by thermal decomposition. Such abietene of commerce is in a relatively pure state and contains only approximately one percent of abietic acid, but may contain some abietine. Chemically, it is probable that abietene is decahydroretene. Abietine, like abietene, is obtained by pyrogenic decomposition of rosin abietic acid or abietyl chloride. Abietine is generally considered a homologue of abietene, having one less carbon atom. All three hydrocarbons, that is, abietene, abietine, and abietane, are characterized as being abietene nucleus hydrocarbons. The expression "abietene nucleus hydrocarbons", as herein employed, refers broadly to all three types of hydrocarbons, and not to the type obtained from abietene alone. Other analogous abietene nucleus hydrocarbons, if available, would be satisfactory as a raw material for preparing the reagents employed in our present process.

The hydrogenation of abietene to produce abietane is conducted in the manner employed to produce hydrogenated aromatics such as "Tetralin", "Hexalin", etc. In some respects the reaction is very similar to the hydrogenation of unsaturated glycerides. Broadly speaking, the method consists of treating abietene with hydrogen at elevated temperature and pressure in the presence of reduced nickel as a catalyst until no more hydrogen is absorbed.

It is well known that hydrocarbons having an abietene nucleus may be sulfonated in the conventional manner to produce sulfonic acids of value for various industrial purposes. U. S. Patent No. 1,910,680 to De Groote and Wirtel, dated May 23, 1933, discloses the use of sulfo abietene bodies for breaking water-in-oil emulsions, and U. S. Patent No. 1,913,538 to De Groote and Wirtel, dated June 13, 1933 discloses the use of sulfo abietane bodies for breaking water-in-oil emulsions. To the extent to which abietine is present as a by-product in abietene, there will be present a certain amount of sulfo abietine in the commercial sulfo abietene bodies. Such sulfo abietine bodies would be just as satisfactory for breaking petroleum emulsions as the sulfo abietene bodies, and may be produced directly from abietine.

U. S. Patent No. 1,596,596 to De Groote, dated August 17, 1926, discloses the use of a polycyclic sulfonic acid material for breaking water-in-oil emulsions. U. S. Patent No. 1,766,062, to De Groote and Keiser, dated June 24, 1933, discloses a demulsifying agent for water-in-oil emulsions consisting of a polycyclic sulfonic acid body in which there has been combined an aldehyde radical or residue. In many instances, such a reagent, that is, one in which there is present an aldehyde radical or residue, may be more effective on certain types of emulsions than a reagent which is similar except that the aldehyde radical or residue is absent. Just as it is possible to produce sulfonic acids from hydrocarbons having the abietene nucleus, likewise it is possible to produce sulfonic acids from hydrocarbons having an abietene nucleus, and further characterized by the presence of an aldehyde residue or radical. The manufacture of such reagents is disclosed in U. S. Patent No. 1,931,257 to Henke & Charlton, dated October 17, 1933. We have found that such reagents, that is, sulfonic acids derived from hydrocarbons having an abietene nucleus and a member of the group consisting of aldehydes and compounds which react l ke aldehydes, are very effective reagents for breaking many water-in-oil emulsions. Such a reagent will sometimes break or resolve a water-in-oil emulsion which can not be successfully broken by the simpler abietene nucleus sulfonic acid bodies. We will refer to such reagents as aldehyde sulfo-abietene nucleus hydrocarbon bodies.

In the manufacture of the reagent contemplated for use in our present process, one may employ any of the hydrocarbons having an abietene nucleus or simple derivatives thereof, such as the chlorine derivatives. Various aliphatic, aromatic, or cyclic aldehydes may be used, such as formaldehyde, paraldehyde, furfural, benzaldehyde, etc. Aldehydes are frequently used in commerce for producing condensation products, such as synthetic resins with phenolic type materials, such as ordinary phenol. In the manufacture of such condensation products it is well known that certain materials, although not strictly aldehydes, may sometimes react in the same manner as if they were aldehydes. Any of these materials which are recognized in the manufacture of synthetic resins as possessing this aldehyde-like property, are considered the equivalent of an aldehyde for the purpose of preparing the reagent employed in our present process. Benzal chloride may be used to replace an ordinary aldehyde. Hexamethylene-tetra-amine may be used to replace the aldehyde. The expression "aldehyde equivalent" will be used herein to refer to either an aldehyde as such, or a material of the type which has been indicated as suitable for use in place of an aldehyde.

A treating agent suitable for use in our process may be obtained by sulfonating an abietene nucleus hydrocarbon at relatively low temperature in the presence of a suitable aldehyde or aldehyde-like body by means of a relatively strong sulfonating agent, such as 100% sulfuric acid, or the aldehyde may be added after sulfonation. The product of the above reaction may be properly termed a sulfonic acid, although it is possible that under certain conditions it may be more akin to an acid sulfate than to a true sulfonic acid. The analogy may be somewhat similar to the reaction of propylene and sulfuric acid, in which propyl hydrogen sulfate is obtained, or even somewhat similar to a reaction in which a dialkyl sulfate is formed. At times more than one sulfo group may be introduced. We consider a product or a material of the kind above referred to, whether in the acid state, or after neutralization with a base, or after esterification, as coming within the term "aldehyde sulfo abietene hydrocarbon nucleus body". Such reagents are obtained by reaction or condensation of an aldehyde or equivalent with abietane, abietene and abietine, or simple derivatives thereof, by means of sulfonating agents including oleum and chlorsulfonic acid, and the term "sulfo" is herein employed without differentiating as to whether they are true sulfonic acids or acid sulfates or of allied structure.

In practising our process, we prefer to use a treating agent or demulsifying agent that is obtained or produced by substantially the following procedure: 200 pounds of sulfuric acid monohydrate are placed in a sulfonator equipped with suitable agitators and cooling devices. Said acid is cooled to approximately 5° C., 100 pounds of abietene, obtained by thermal decomposition of rosin and having a specific gravity of 0.99 at 15° C. and a boiling point of about 340–350° C. is added slowly and the temperature maintained between 0 and 5° C. by means of the cooling coil. The reaction is cont nued until a small sample of the reaction mass, when dissolved in water, gives a clear solution, thus indicating that no unsulfonated material remains. 20 pounds of a 40% aqueous solution of formaldehyde is then added, with continuous stirring. The formaldehyde solution must be added with extreme care and caution, because at times a reaction of almost explosive violence may take place. When all the formaldehyde has been added, agitation is continued for approximately five hours. The reaction mass is now diluted with approximately 250 parts of cold water, stirred thoroughly, and allowed to separate into two layers. The lower aqueous layer represents essentially spent ac d, and is discarded. The upper layer, a dark acidic mass, contains the formaldehyde abietene sulfonic acid condensation product. It is neutralized carefully and slowly with strong ammonia, without permitting a rise in temperature above 20° C., and used in the form thus obtained. If one des res, the product may be evaporated and a dry solid material, substantially anhydrous, is thus obtained. A dilute solution of the reagent thus prepared forms a precipitate in presence of water-soluble calcium or magnesium salts.

The dark oily acidic mass (aldehyde abietine sulfonic acid) obtained as above, or from equivalent reagents, may be used to constitute the treating agent of our process, or it may be neutralized prior to use with some other suitable basic material, instead of ammonia, such as caustic soda, caustic potash, sodium carbonate, potassium carbonate, ammonium carbonate, triethanolamine, calc um hydroxide, magnesium hydroxide, etc. If desired the aldehyde abietene nucleus hydrocarbon sulfonic acid, as above described, may be converted into an ester by conventional reaction methods with suitable alcohols, aromatic or aliphatic, and the resultant ester or esters used to constitute the treating agent of our process. Some of the esters thus obtained may be o l-soluble and some may be water-soluble. The salts, such as obtained by neutralization with inorganic bases, are usually water-soluble and a few may even be water-insoluble, as in the case of aluminum.

We prefer to use aldehyde sulfo abietene nucleus hydrocarbon bodies in the form of water soluble salts, which are characterized by the fact that they produce insoluble precipitates with the common water soluble alkaline earth salts; that is, calcium and magnesium salts. If sulfonation is carried out too vigorously, so as to introduce more than two sulfonic groups into the abietene nucleus, it often happens that even the calcium and magnesium salts of such polysulfonated abietene nucleus hydrocarbons are water soluble. Although these latter salts may be effective, we prefer to use the former. Indeed, reagents of the kind described, even though apparently water and oil-insoluble, may still be effective treating agents, because one part in 20,000 will often break a refractory emulsion.

Reagents exhibiting solubility of such limited degree as one part in 20,000 are often referred to as "insoluble".

The specific form, state or condition of the treating agent at the time it is used or applied to the petroleum emulsion to be treated is immaterial and may be varied to suit existing conditions. It can be used in substantially anhydrous state or in solutions of any convenient strength. A concentrated solution of an aldehyde abietene sulfonic acid salt can be emulsified with oil by the agency of any suitable oil-soluble emulsifier, such as calcium oleate and the resultant mixture used to constitute the treating agent of our process. The treating agent can be formed entirely from a material of the kind previously described, or it can be formed from such a material in combination with another or other well known treating agents for petroleum emulsions of the water-in-oil type, such as water softeners, modified fatty bodies or their salts, petroleum sulfonic acids or their salts, alkylated aromatic sulfonic acid or salts, dibasic carboxy acid derivatives, or other substances known to have similar demulsifying properties.

In practicing our process, a treating agent or demulsifying agent of the kind above described is brought into contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment the emulsion is allowed to stand in a quiescent state, usually in a settling tank, at a temperature varying from atmospheric temperature to about 200° F., so as to permit the water or brine to separate from the oil, it being preferable to keep the temperature low enough so as to prevent the valuable constituents of the oil from volatilizing. If desired, the treated emulsion may be acted upon by one or the other of various kinds of apparatus now used in the operation of breaking petroleum emulsions, such as homogenizers, hay tanks, gun barrels, filters, centrifuges, or electrical dehydrators.

The amount of treating agent on the anhydrous basis that is required to break the emulsion may vary from approximately 1 part of treating agent to 500 parts of emulsion, up to a ratio of 1 part of treating agent to 20,000 parts of emulsion, depending upon the type or kind of emulsion being treated. In treating exceptionally refractory emulsions of the kind commonly referred to as "tank bottoms" or "residual pit oils", the ratio of 1 to 500, above referred to, is often necessary, but in treating fresh emulsions, i. e., emulsions that will yield readily to the action of chemical demulsifying agents, the ratio 1 to 20,000 above mentioned, will frequently produce highly satisfactory results. For the average petroluem emulsion of the water-in-oil type a ratio of 1 part of treating agent to 10,000 parts of emulsion will usually be found to produce commercially satisfactory results.

Having thus described our invention, what we claim as new and desire to secure by Letters Patent is:

1. A process for breaking petroleum emulsions of the water-in-oil type, which consists in subjecting the emulsion to the action of a demulsifying agent containing an aldehyde sulfo abietene nucleus hydrocarbon body selected from the class comprising acids, salts, and esters.

2. A process for breaking petroleum emulsions of the water-in-oil type, which consists in subjecting the emulsion to the action of a demulsifying agent containing an aldehyde sulfo abietene nucleus hydrocarbon body selected from the class comprising acids, salts, and esters, and derived from abietane.

3. A process for breaking petroleum emulsions of the water-in-oil type, which consists in subjecting the emulsion to the action of a demulsifying agent containing an aldehyde sulfo abietene nucleus hydrocarbon body selected from the class comprising acids, salts, and esters, and derived from abietene.

4. A process for breaking petroleum emulsions of the water-in-oil type, which consists in subjecting the emulsion to the action of a demulsifying agent containing an aldehyde sulfo abietene nucleus hydrocarbon body selected from the class comprising acids, salts, and esters, and derived from abietine.

5. A process for breaking petroleum emulsions of the water-in-oil type, which consists in subjecting the emulsion to the action of a demulsifying agent containing an aldehyde sulfo abietene nucleus hydrocarbon body in the form of a water soluble salt.

6. A process for breaking petroleum emulsions of the water-in-oil type, which consists in subjecting the emulsion to the action of a demulsifying agent containing an aldehyde sulfo abietene nucleus hydrocarbon body in the form of a water-soluble salt derived from abietane.

7. A process for breaking petroleum emulsions of the water-in-oil type, which consists in subjecting the emulsion to the action of a demulsifying agent containing an aldehyde sulfo abietene nucleus body in the form of a water-soluble salt derived from abietene.

8. A process for breaking petroleum emulsions of the water-in-oil type, which consists in subjecting the emulsion to the action of a demulsifying agent containing an aldehyde sulfo abietene nucleus hydrocarbon body in the form of a water-soluble salt derived from abietine.

9. A process for breaking petroleum emulsions of the water-in-oil type, which consists in subjecting the emulsion to the action of a demulsifying agent containing a water-soluble salt of aldehyde sulfo abietene nucleus hydrocarbon body, and characterized by the fact that it produces a precipitate when reacted in an aqueous medium with a soluble alkaline earth salt.

10. A process for breaking petroleum emulsions of the water-in-oil type, which consists in subjecting the emulsion to the action of a demulsifying agent containing a water-soluble salt of aldehyde sulfo abietene nucleus hydrocarbon body derived from abietane, and characterized by the fact that it produces a precipitate when reacted in an aqueous medium with a soluble alkaline earth salt.

11. A process for breaking petroleum emulsions of the water-in-oil type, which consists in subjecting the emulsion to the action of a demulsifying agent containing a water soluble salt of aldehyde sulfo abietene nucleus hydrocarbon body derived from abietene, and characterized by the fact that it produces a precipitate when reacted in an aqueous medium with a soluble alkaline earth salt.

12. A process for breaking petroleum emulsions of the water-in-oil type, which consists in subjecting the emulsion to the action of a demulsifying agent containing a water-soluble salt of aldehyde sulfo abietene nucleus hydrocarbon body derived from abietine, and characterized by the fact that it produces a precipitate when reacted in an aqueous medium with a soluble alkaline earth salt.

13. A process for breaking petroleum emulsions of the water-in-oil type, which consists in subjecting the emulsion to the action of a demulsifying agent containing a water soluble salt of aldehyde sulfo abietene nucleus hydrocarbon body derived from formaldehyde, and characterized by the fact that it produces a precipitate when reacted in an aqueous medium with a soluble alkaline earth salt.

14. A process for breaking petroleum emulsions of the water-in-oil type, which consists in subjecting the emulsion to the action of a demulsifying agent containing a water soluble salt of aldehyde sulfo abietene nucleus hydrocarbon body derived from formaldehyde and abietane, and characterized by the fact that it produces a precipitate when reacted in an aqueous medium with a soluble alkaline earth salt.

15. A process for breaking petroleum emulsions of the water-in-oil type, which consists in subjecting the emulsion to the action of a demulsifying agent containing a water-soluble salt of aldehyde sulfo abietene nucleus hydrocarbon body derived from formaldehyde and abietene, and characterized by the fact that it produces a precipitate when reacted in an aqueous medium with a soluble alkaline earth salt.

16. A process for breaking petroleum emulsions of the water-in-oil type, which consists in subjecting the emulsion to the action of a demulsifying agent containing a water-soluble salt of aldehyde sulfo abietene nucleus hydrocarbon body derived from formaldehyde and abietine, and characterized by the fact that it produces a precipitate when reacted in an aqueous medium with a soluble alkaline earth salt.

17. A process for breaking petroleum emulsions of the water-in-oil type, which consists in subjecting the emulsion to the action of a demulsifying agent containing a water-soluble ammonium salt of aldehyde sulfo abietene nucleus hydrocarbon body derived from formaldehyde, and characterized by the fact that it produces a precipitate when reacted in an aqueous medium with a soluble alkaline earth salt.

18. A process for breaking petroleum emulsions of the water-in-oil type, which consists in subjecting the emulsion to the action of a demulsifying agent containing a water-soluble ammonium salt of aldehyde sulfo abietene nucleus hydrocarbon body derived from formaldehyde and abietane, and characterized by the fact that it produces a precipitate when reacted in an aqueous medium with a soluble alkaline earth salt.

19. A process for breaking petroleum emulsions of the water-in-oil type, which consists in subjecting the emulsion to the action of a demulsifying agent containing a water-soluble ammonium salt of aldehyde sulfo abietene nucleus hydrocarbon body derived from formaldehyde and abietene, and characterized by the fact that it produces a precipitate when reacted in an aqueous medium with a soluble alkaline earth salt.

20. A process for breaking petroleum emulsions of the water-in-oil type, which consists in subjecting the emulsion to the action of a demulsifying agent containing a water-soluble ammonium salt of aldehyde sulfo abietene nucleus hydrocarbon body derived from formaldehyde and abietine, and characterized by the fact that it produces a precipitate when reacted in an aqueous medium with a soluble alkaline earth salt.

21. A process for breaking petroleum emulsions of the water-in-oil type, which consists in subjecting the emulsion to the action of a demulsifying agent derived from chemical reaction of an abietene nucleus hydrocarbon, an aldehyde equivalent, and a sulfonating agent.

MELVIN DE GROOTE.
ARTHUR F. WIRTEL.